(12) United States Patent
Vitito (10) Patent No.: US 8,255,958 B2
(45) Date of Patent: Aug. 28, 2012

(54) AUTOMOBILE ENTERTAINMENT SYSTEM LINKING MULTIPLE VIDEO SYSTEMS FOR COORDINATED SHARING OF VIDEO CONTENT

(75) Inventor: Christopher J. Vitito, Lakeland, FL (US)

(73) Assignee: Audiovox Corporation, Hauppauge, NY (US)

(*) Notice: Subject to any disclaimer, the term of this patent is extended or adjusted under 35 U.S.C. 154(b) by 1558 days.

(21) Appl. No.: 10/895,110

(22) Filed: Jul. 21, 2004

(65) Prior Publication Data

US 2005/0102697 A1    May 12, 2005

Related U.S. Application Data

(60) Provisional application No. 60/517,862, filed on Nov. 7, 2003, provisional application No. 60/534,705, filed on Jan. 8, 2004, provisional application No. 60/571,516, filed on May 17, 2004.

(51) Int. Cl.
*H04N 7/18* (2006.01)
*H04N 5/64* (2006.01)

(52) U.S. Cl. ............. 725/75; 725/74; 348/837; 348/840

(58) Field of Classification Search .................... 725/75, 725/74, 76–78, 82, 85; 348/836, 837, 840
See application file for complete search history.

(56) References Cited

U.S. PATENT DOCUMENTS

| 4,647,980 | A | 3/1987 | Steventon et al. |
| 4,835,604 | A | 5/1989 | Kondo et al. |
| 5,529,265 | A | 6/1996 | Sakurai |
| 5,842,715 | A | 12/1998 | Jones |
| 6,058,288 | A | 5/2000 | Reed et al. |
| 6,250,967 | B1 | 6/2001 | Chu |
| 6,678,892 | B1 | 1/2004 | Lavelle et al. |
| 2002/0105507 | A1 | 8/2002 | Tranchina et al. |
| 2002/0113451 | A1 | 8/2002 | Chang |
| 2003/0020840 | A1 | 1/2003 | Hays et al. |
| 2003/0184137 | A1 | 10/2003 | Jost |
| 2004/0083491 | A1* | 4/2004 | Chang .............................. 725/75 |
| 2004/0205821 | A1* | 10/2004 | Yamada et al. .................. 725/80 |
| 2004/0227696 | A1* | 11/2004 | Schedivy ........................... 345/7 |

FOREIGN PATENT DOCUMENTS

| DE | 29608032 | 8/1996 |
| EP | 0282183 | 9/1988 |
| FR | 2801854 | 6/2001 |
| FR | 2817812 | 6/2002 |
| JP | 3219289 | 9/1988 |
| WO | WO90/15508 | 12/1990 |
| WO | WO02/073574 | 9/2002 |

* cited by examiner

*Primary Examiner* — John Schnurr
(74) *Attorney, Agent, or Firm* — Frank Chau & Associates LLC (57) ABSTRACT

An automobile entertainment system includes a plurality of video systems, each video system mounted within an automobile headrest. The headrest includes a headrest body and a first downwardly extending extension arm having a passage extending therethrough. The entertainment system also includes a central switching assembly linking the plurality of video systems. At least one of the video systems includes an output transmitting signals to the central switching assembly to transfer to the remaining video systems. Each video system also includes an input transmitting signals from the central switching assembly to the respective video systems.

9 Claims, 8 Drawing Sheets

AUTOMOBILE ENTERTAINMENT SYSTEM LINKING MULTIPLE VIDEO SYSTEMS FOR COORDINATED SHARING OF VIDEO CONTENT

CROSS REFERENCE TO RELATED APPLICATION

This application is based upon U.S. Provisional Patent Application Nos. 60/517, 862, filed Nov. 7, 2003, entitled "AUTOMOBILE ENTERTAINMENT SYSTEM", 60/534, 705, filed Jan. 8, 2004, entitled "AUTOMOBILE ENTERTAINMENT SYSTEM", and 60/571,516, filed on May 17, 2004, entitled "AUTOMOBILE ENTERTAINMENT SYSTEM".

BACKGROUND OF THE INVENTION

1. Field of the Invention

The invention relates to an automobile entertainment system. More particularly, the invention relates to the networking of multiple video systems within an automobile for selective sharing of video content among the multiple video systems within the automobile.

2. Description of the Prior Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount within the headrest of an automobile have also been developed.

These headrest entertainment systems allow multiple individuals to view a variety of different video sources within the same vehicle. However, and as those skilled in the art will certainly appreciate, it is often desirable to share the video content being presented on the various video systems within the vehicle. The present invention provides a distribution system for sharing video content within an automobile employing multiple video systems.

SUMMARY OF THE INVENTION

It is, therefore, an object of the present invention to provide an automobile entertainment system including a plurality of video systems, each video system mounted within an automobile headrest. The headrest includes a headrest body and a first downwardly extending extension arm having a passage extending therethrough. The entertainment system also includes a central switching assembly linking the plurality of video systems. At least one of the video systems includes an output transmitting signals to the central switching assembly to transfer to the remaining video systems. Each video system also includes an input transmitting signals from the central switching assembly to the respective video systems.

It is another object of the present invention to provide an entertainment system wherein each video system includes a video monitor and a video source.

It is also an object of the present invention to provide an entertainment system wherein the video source is a DVD player.

It is a further object of the present invention to provide an entertainment system wherein the central switching assembly includes a wireless transmitter.

It is also an object of the present invention to provide an entertainment system wherein the wireless transmitter is an FM wireless transmitter for the transmission of audio signals to an automobile radio.

It is also another object of the present invention to provide an entertainment system wherein the plurality of video systems includes a first video system, a second video system, a third video system and a fourth video system.

It is still another object of the present invention to provide an entertainment system wherein the first video system and the second video system respectively include an output transmitting signals to the central switching assembly.

It is yet another object of the present invention to provide an entertainment system wherein the outputs of the first video system and the second video system include wiring for power, right and left audio output signals, and a video output signal.

It is a further object of the present invention to provide an entertainment system wherein the output includes wiring for power, right and left audio output signals, and a video output signal.

It is also a further object of the present invention to provide an entertainment system wherein the input of each video system includes wiring for power, right and left audio output signals, and a video output signal.

It is still a further object of the present invention to provide an entertainment system wherein the central switching assembly includes a central processor programmed to control the transmission of signals in an efficient manner.

It is also an object of the present invention to provide an entertainment system wherein the central switching assembly supplies power to the various video systems connected thereto.

It is another object of the present invention to provide an entertainment system wherein the central switching assembly is connected to an automobile power supply.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWINGS

FIGS. 9a and 9b respectively disclose a front view of the video system housing and a cross sectional view of the video system housing along the line B-B in FIG. 9a.

DESCRIPTION OF THE PREFERRED EMBODIMENTS

The detailed embodiment of the present invention is disclosed herein. It should be understood, however, that the disclosed embodiment is merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to FIGS. 1 to 15, an automobile entertainment system 10 is disclosed. The automobile entertainment system 10 is composed of a series of video and audio components integrated within an automobile 11. In particular, the entertainment system 10 includes a video system 12 mounted within a standard headrest 14 of an automobile 11. The video system 12 generally includes a video monitor 16 for presenting video content and a video source 20 integrated therewith. In accordance with a preferred embodiment of the present invention, the video source is a DVD player 20 coupled to the video monitor 16 for the transmission of video content thereto. However, those skilled in the art will appreciate that the video source may take a variety of forms without departing from the spirit of the present invention; for example, and not limited to, satellite video systems and Bluetooth wireless based systems. The video system 12 also includes an associated support frame 18. The video system 12 is mounted along the rear portion of the headrest 14 such that an individual sitting in the rear seat of the automobile 11 may watch the material presented on the video monitor 16 without disturbing the driver of the automobile 11.

The video system 12 also includes an associated housing 17 with a support frame 18. The video system 12 is mounted along the rear portion of the headrest 14 such that an individual sitting in the rear seat of the automobile 11 may watch the material presented on the video monitor 16 without disturbing the driver of the automobile 11.

The video monitor 16, DVD player 20 and associated control components are mounted within the housing 17. As those skilled in the art will certainly appreciate, the video monitor 16 is mounted for viewing via an opening in the housing 17. With regard to the DVD player 20, it is integrally molded within the housing 17 and positioned for insertion of the DVDs behind the video monitor 16. By mounting the DVD player 20 in this way, a stable structure is developed that is well adapted for the automobile environment.

Figure 1:
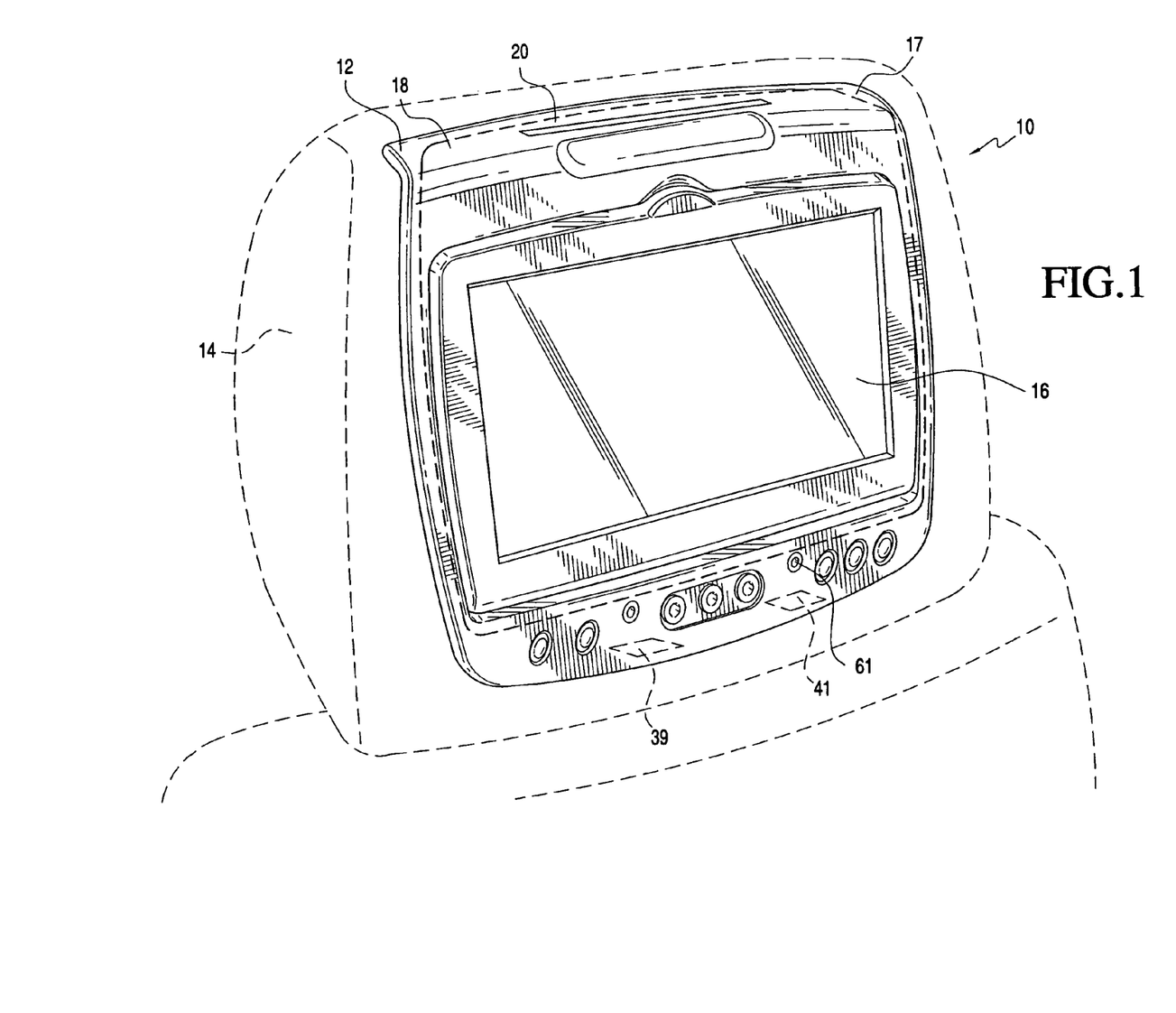
FIGS. 1, 2, 3 and 4 present various views of the video system in accordance with the present invention.
Figure 2:
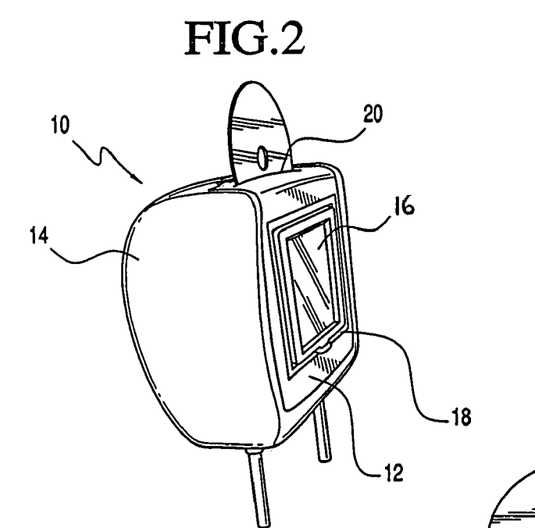
Figure 3:
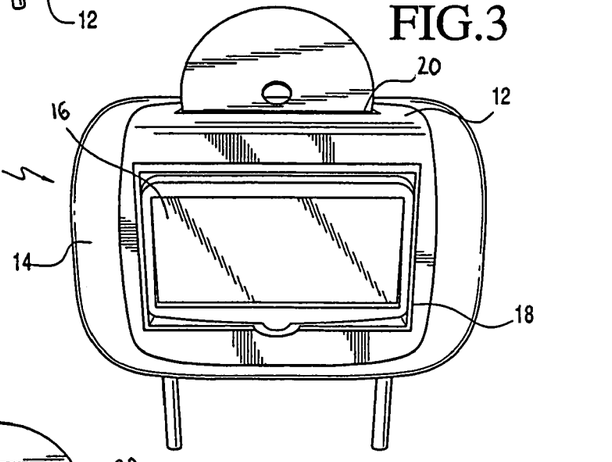
Figure 4:
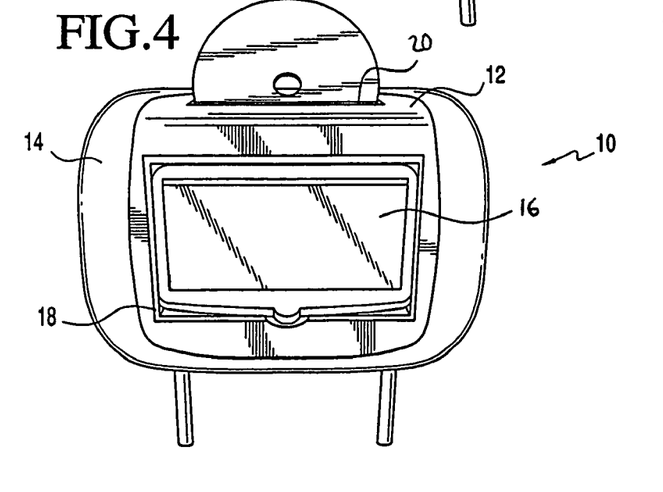
Figure 5:
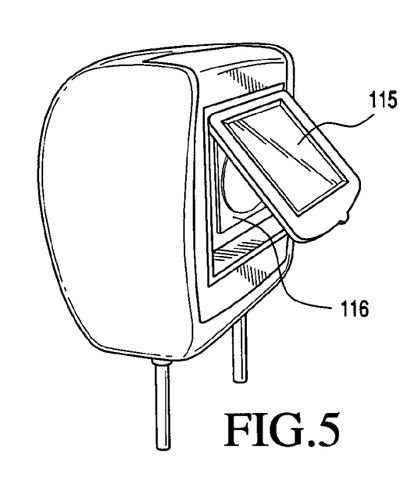
FIGS. 5, 6, 7 and 8 disclose alternate embodiments of the video system in accordance with the present invention.
Figure 6:
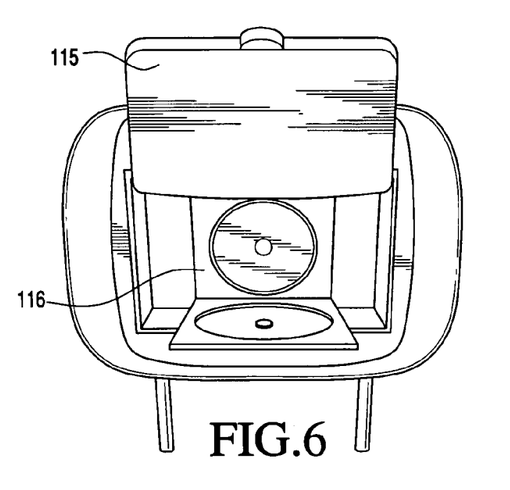
Figure 7:
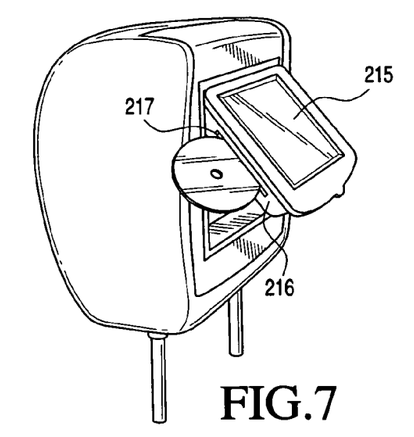
Figure 8:
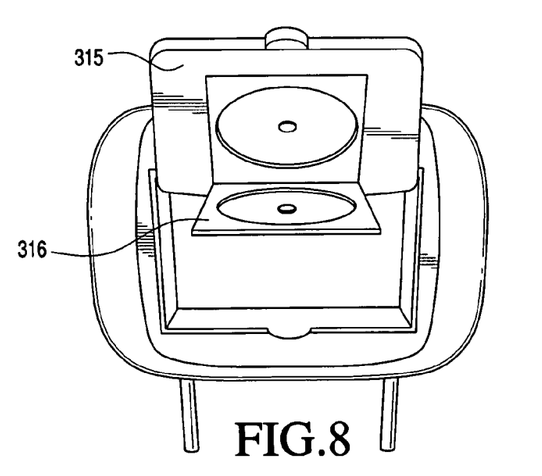

While the DVD player 20 is disclosed as being a slot-loaded design with insertion behind the video monitor, the DVD player could take a variety of other forms while still being integrated with the video monitor 16. With reference to FIGS. 5 and 6, the DVD player 116 may be positioned beneath the pivotally mounted video monitor 115. With reference to FIG. 7, the DVD player 216 may be integrated with the video monitor 215 and facilitate access via a side loading slot 217. Referring to FIG. 8, the DVD player 316 is integrated with the underside of the video monitor 315 and the DVD is snapped into DVD player 316 when the monitor is pivoted upward. In addition, the DVD player may be designed with a built in TV tuner for providing the user with a choice of video sources. The DVD player may also be provided remotely from the video monitor and housing without departing from the spirit of the present invention.

Figure 9A:
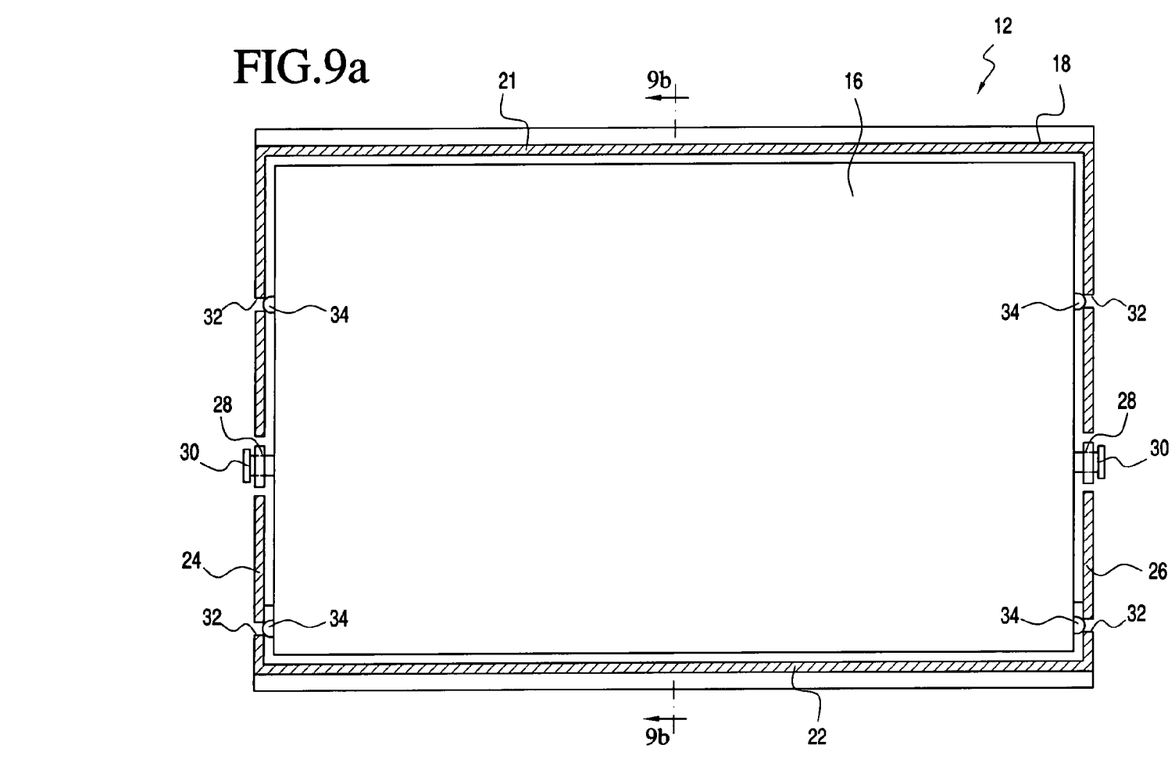
Figure 9B:
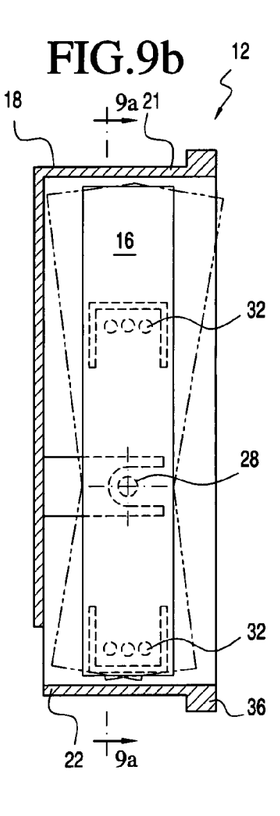

With reference to FIGS. 9a and 9b, the housing 17 for the present video system is disclosed. The housing 17 includes a support frame 18 in which the video monitor 16 is pivotally mounted. More specifically, the support frame 18 is a generally rectangular shell in which the video monitor 16 is mounted. The support frame 18 includes a top wall 21 and a bottom wall 22 connected by a first and second sidewalls 24, 26.

The first and second sidewalls 24, 26 are respectively provided with bearing slots 28 shaped and dimensioned for receiving lateral posts 30 extending from the sides of the video monitor 16. In this way, the lateral posts 30 are mounted within the bearing slots 28 permitting controlled pivoting of the video monitor 16 within the support frame 18.

The controlled movement of the video monitor 16 within the support frame 18 is facilitated by the provision of selectively engageable recesses 32 and detents 34 respectively formed on the support frame 18 and the video monitor 16. The detents 34 are shaped and dimensioned for engagement with the various recesses 32 as the video monitor 16 is pivoted relative to the support frame 18. More specifically, the detents 34 interact with the recesses 32 to control movement of the video monitor 16 by creating predetermined stopping points. As those skilled in the art will certainly appreciate, the support frame 18 includes an outer flange 36 facilitating attachment of the video system 12 to the headrest 14 of an automobile 11.

Figure 10A:
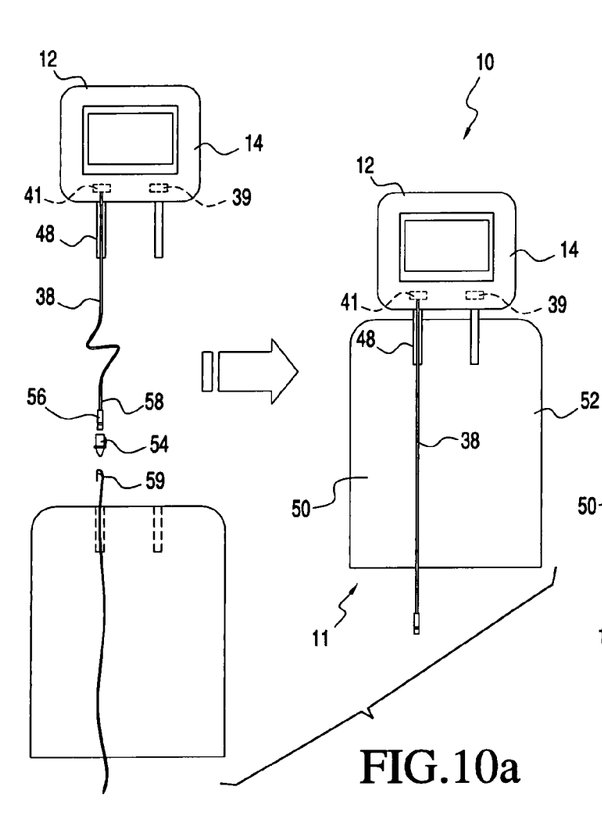
FIGS. 10a and 10b are wiring schematics for installation of the present automobile entertainment system in accordance with a first embodiment.
Figure 10B:
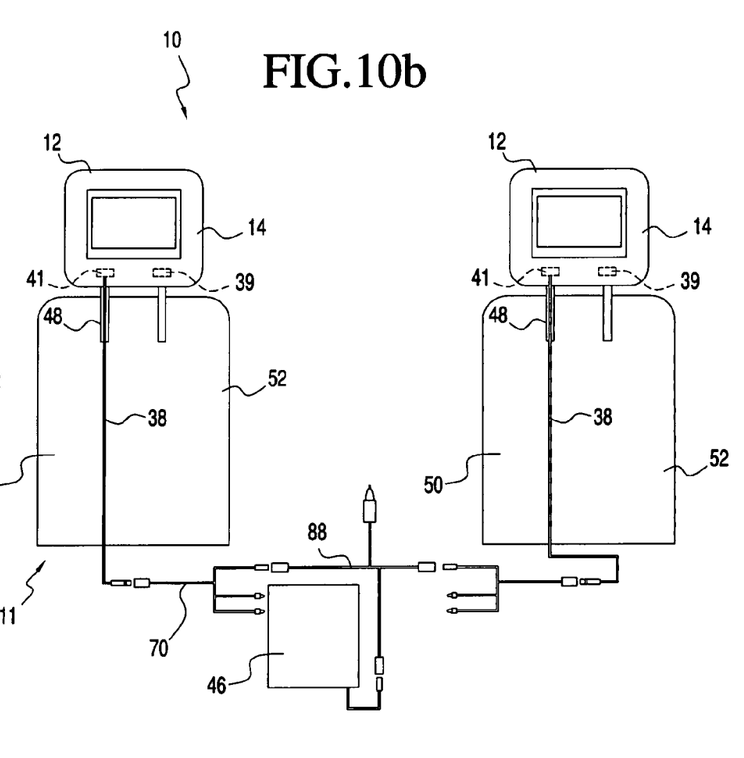

As briefly mentioned above, the video system 12 is mounted within the headrest 14. As those skilled in the art will readily appreciate, the video system 12 is provided with inputs 39 and outputs 41 for audio and video. With reference to the embodiment disclosed in FIG. 10, a multi-wire cable 38 extends from the outputs 41 of the video system 12. The wires making up the multi-wire cable 38 include those for a power supply 40 and the left and right audio outputs 42, 44 used in providing audio to an alternate audio system, for example, a wireless RF transmitter 46 as will be discussed below in greater detail. Referring to FIG. 10, the video system 12 is electrically connected to the remainder of the automobile 11 and a wireless RF transmitter 46 via electrical communication lines extending through the extension arm 48 of the headrest 14 and the back 50 of the vehicle seat 52. For example, and as will be discussed below in substantial detail, a power source wire 40 and audio output wires 42, 44 are respectively connected to the video system 12 in accordance with a preferred embodiment of the present invention.

Figure 11:
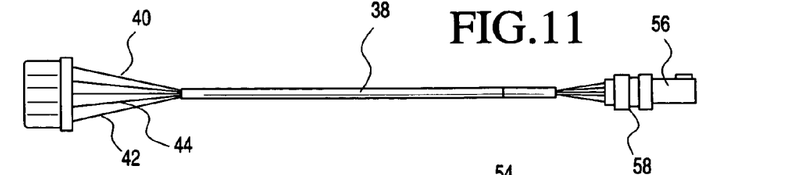
FIG. 11 is a side view of a multi-wire cable used in directing power and audio signals through the back of a vehicle seat.

In order to facilitate ease of installation, and with reference to FIGS. 10 and 11, the multiple wires required for the power source 40 and audio outputs 42, 44 are maintained within a single multi-wire cable 38. The multiple wires are passed through a single extension arm 48 of the headrest 14 with the chosen extension arm 48 functioning as a conduit for running the multi-wire cable 38 from the video system 12 to the remainder of the automobile 11.

Figure 12:
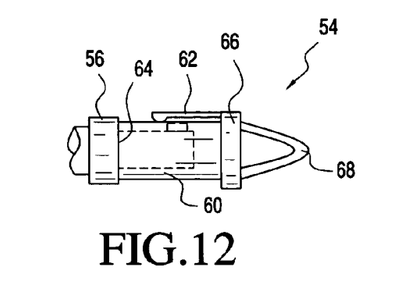
FIG. 12 is a side view of a removable eyelet utilized in drawing the cable shown in FIG. 11 through the back of a vehicle seat.
Figure 12A:
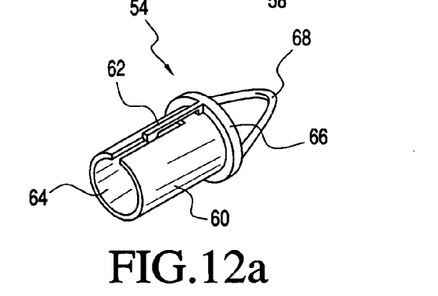
FIG. 12a is a perspective view of the eyelet shown in FIG. 12.

Referring to FIGS. 10, 12 and 12a, the passage of the multi-wire cable 38 through the headrest extension arm 48 and the back 50 of the vehicle seat 52 is facilitated by the provision of a selectively removable eyelet 54 coupled to the connector shroud 56 at the distal end 58 of the multi-wire cable 38. The provision of the eyelet 54 allows the connector shroud 56 to be gripped and pulled through the extension arm 48 and the back 50 of the vehicle seat 52 through utilization of a traditional "wire puller" 59 used by electricians to pull wires through walls and other confined spaces.

Passage of the connector shroud 56 through the extension arm 48 and the back 50 of the vehicle seat 52 is further enhanced by the shape of the connector shroud 56. More particularly, the connector shroud 56 is cylindrical and is shaped and dimensioned to readily fit within the extension arm 48 of a conventional headrest 44. As will be discussed below in greater detail, the connector shroud 56 houses a plurality of connector pins 80 used in linking the video system to other components of the present invention.

The eyelet 54 includes a cylindrical housing 60 shaped and dimensioned to fit over the connector shroud 56. The eyelet 54 is selectively secured to the shroud 56 via a conventional lock arm 62 used in the secure connection of cable connectors. The cylindrical housing 60 includes an open first end 64 that is shaped to receive the connector shroud 56 and a second end 66 having a closed loop 68 extending therefrom. The closed loop 68 is shaped and dimensioned for engagement with the "wire puller" 59. In this way, the eyelet 54 is secured to the connector shroud 56 at the distal end 58 of the multi-wire cable 38 and both are drawn through the back 50 of the vehicle seat 52 by the "wire puller" 59. Once the distal end 58 of the multi-wire cable 38 is pulled through the vehicle seat 52, the eyelet 54 is removed from the connector shroud 56 and the cable 38 is ready for attachment to various components as described below in greater detail. Although a closed loop is disclosed for attachment to the wire puller in accordance with a preferred embodiment of the present invention, other structural coupling members, for example, hook, snap, open loop, etc. could be used without departing from the spirit of the present invention.

Figure 13A:
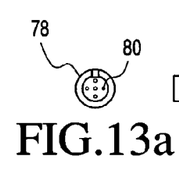
FIG. 13 is a side view of a power/audio adaptor for connecting the present system to various remote components.
Figure 13B:
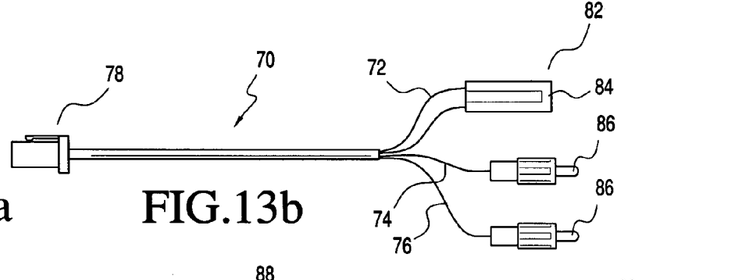

Once the distal end 58 of the multi-wire cable 38 is pulled though the back 50 of the vehicle seat 52, various adaptors may be used to couple it to the appropriate power, video and audio sources. With reference to FIG. 13, and in accordance with a preferred embodiment of the present invention a power/audio adaptor 70 including wiring for power transmission 72, left audio transmission 74 and right audio transmission 76 is shown. The proximal end 78 of the adaptor 70 is provided with male pins 80 for connection with the female connection structures (not shown) provided at the distal end 58 of the multi-wire cable 38. The distal end 82 of the adaptor 70 includes a power connection 84 and standard RCA connections 86 for the audio signal.

Figures 14, 15:
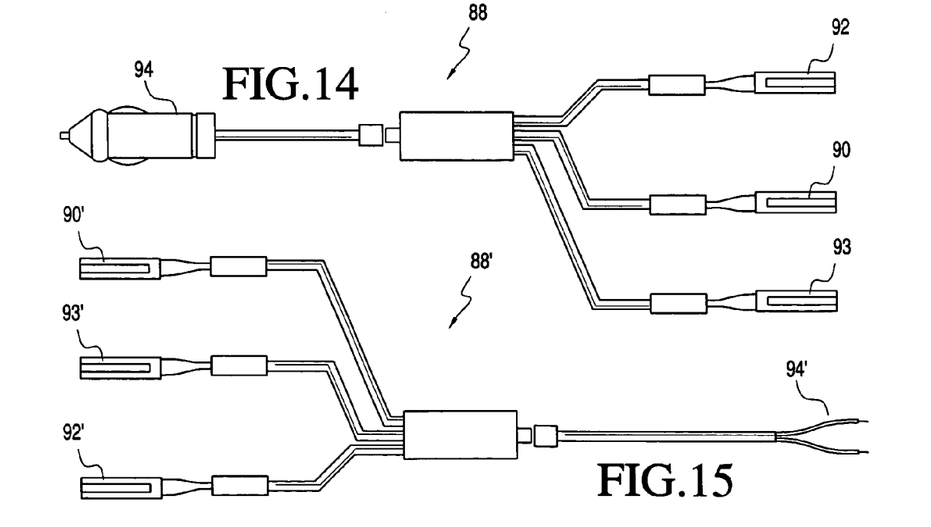
FIGS. 14 and 15 disclose alternate embodiments of a power adaptor for connecting the present system to a power supply.

FIGS. 14 and 15 disclose further power adaptors 88, 88' for connection to the power connection 84 of the power/audio adaptor 70 shown in FIG. 13. In particular, FIG. 14 discloses a power adaptor 88 for tapping into a power source via a DC "cigarette lighter", or power adaptor outlets, provided in most vehicles and FIG. 15 discloses a power adaptor 88' for direct connection to the vehicle power source (not shown).

The power adaptor 88 shown in FIG. 14 includes first and second connectors 90, 92 (potentially a third connector 93 for attachment to the power input of the RF transmitter 46) shaped and dimensioned for engagement with the power connectors 84 of the power/audio adaptors 70 of the two video systems 12 installed in adjacent headrests 14. The power adaptor 88 also includes a conventional power plug 94 at the opposite end for plugging into a power adaptor outlet. As such, multiple systems 12 may be connected to a single power source.

The power adaptor 88' shown in FIG. 15 includes first and second connectors 90', 92' (potentially a third connector 93' for attachment to the power input of the RF transmitter 46) shaped and dimensioned for engagement with the power connectors 84 of the power/audio adaptors 70 of the two video systems 12 installed in adjacent headrests 14. The power adaptor 88' also includes a conventional pair of electrical lines 94' at the opposite end for connection to the automobile power supply. As such, multiple systems 12 may be connected to a single power source.

More particularly, and in accordance with preferred embodiments of the present invention, the power source wire 40 may runs either directly from the main automobile power source (see FIG. 15) or via the power adaptor outlet via a power adaptor outlet (see FIG. 14).

As those skilled in the art will certainly appreciate, the audio portion of the source may be transmitted to users in a variety of ways without departing from the spirit of the present invention. For example, and in accordance with a preferred embodiment of the present invention, the video monitors 16 are provided with a direct audio input 61 allowing users to simply plug-in their headphones to listen to the audio content of the source being transmitted by the video monitor 16.

In accordance with still a further feature of the present invention, the audio source being generated by the DVD player 20 is transmitted to a wireless RF transmitter 46 via the audio output wires 40, 42 discussed above, which transmits the audio content at a frequency received by the radio system of the automobile 11 or wireless headphones. In this way, the users of the present system need only tune to a predetermined radio frequency to listen to the audio content through the traditional speaker system of the automobile 11. Further, and in accordance with yet a further embodiment of the present invention, the audio output wires 40, 42 of the DVD player 20 may be hardwired to the radio of the automobile 11 for listening over the stereo system of the automobile 11. As those skilled in the art will certainly appreciate, it is further contemplated the audio output wires 40, 42 may be connected to a variety of other sound transducers which convert the audio signals to audible sounds for listening by those watching the video monitor without departing from the spirit of the present invention. As mentioned above, where headphones are utilized the audio outputs will preferably be connected to a wireless transmitter for use in conjunction with wireless headphones. Optionally, it is contemplated the audio outputs may be connected to a switch box allowing for selective use of both the audio system of the automobile and/or an audio jack (for attachment with a headphone). As those skilled in the art will certainly appreciate, the system will also include ports for the attachment of video games and other video sources.

Control of the DVD player 20 is facilitated by the provision of control buttons (not shown) along the outer surface of the DVD player. The control buttons are conventional in the art and may take a variety of forms. In addition to the provision of manual control buttons, the DVD player may further include a remote control (not shown) such that an individual need not actually touch the DVD player 20 or video system 12 to control the video content or the volume generated by the video system 12. Once again, and as those skilled in the art will certainly appreciate, a variety of remote control systems may be utilized without departing from the spirit of the present invention.

Figure 16A:
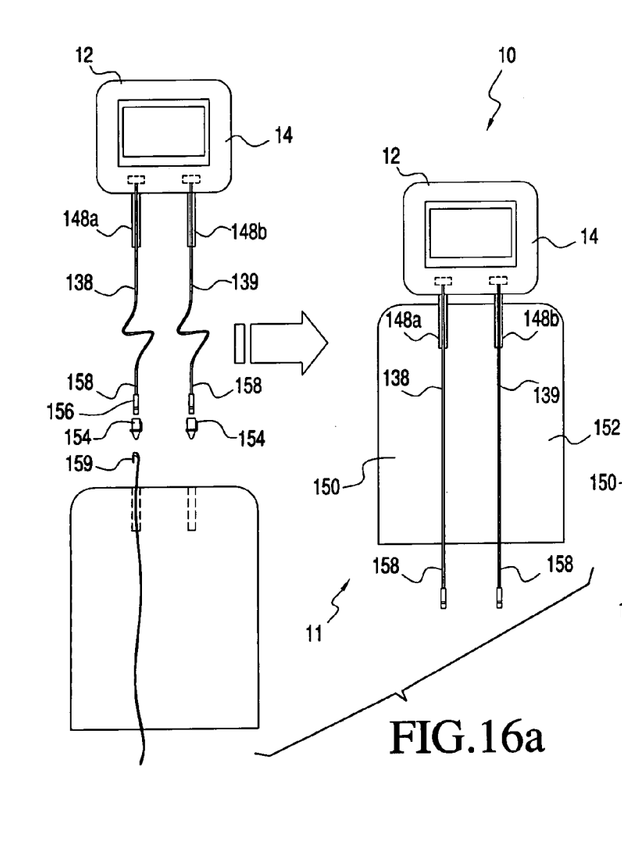
FIGS. 16a and 16b are wiring schematics for installation of the present automobile entertainment system employing an alternate wiring arrangement.
Figure 16B:
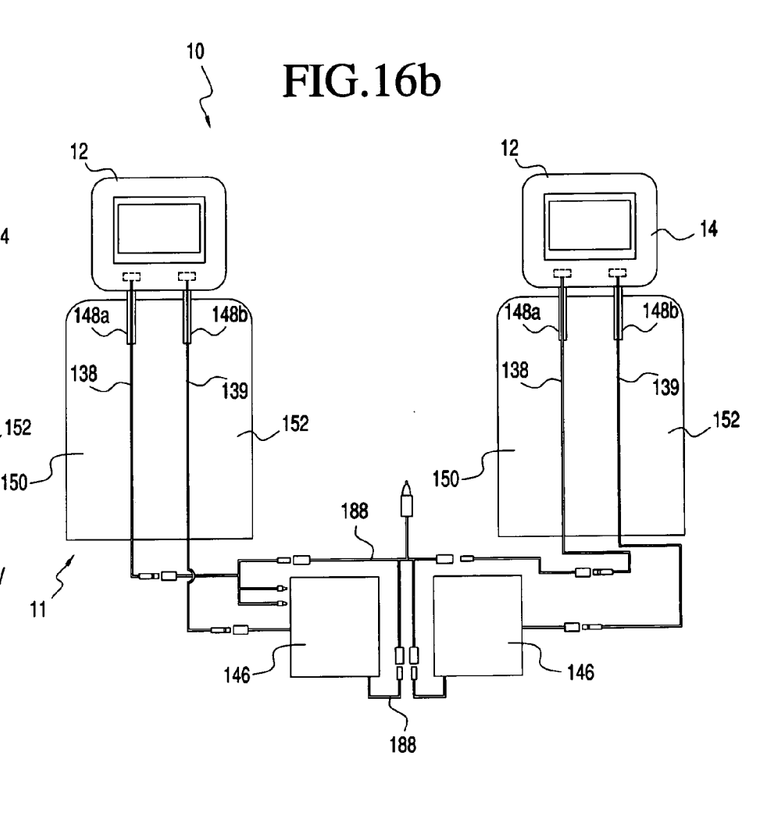

The versatility of the present system may be further enhanced by the provision of different cables for the power and the audio output. For example, and with reference to FIG. 16, separate cables 138, 139 extend through the respective support arms 148a, 4148b of the headrest 14. As with the prior embodiment, the passage of the power cable 138 and the audio output cable 139 through the headrest extension arms 148a, 148b and the back 150 of the vehicle seat 152 is facilitated by the provision of an eyelet 154 with the connector shroud 156 at the distal end 158 of the cables 138, 139. The provision of the eyelet 154 allows for the connector shroud 156 to be gripped and pulled through the extension arms 148a, 148b and the back 150 of the vehicle seat 152 through utilization of a traditional "wire puller" 159 used by electricians to pull wires through walls and other confined spaces.

As mentioned above, once the distal end 158 of the power cable 138 and audio output cable 139 are pulled though the back 150 of the vehicle seat 152, various adaptors may be used to couple it to the appropriate power and audio sources. In accordance with this embodiment, it is preferred that the audio output cable 139 be directly connected to a wireless RF transmitter 146, while either of the power adaptors 188, 188' disclosed in FIGS. 14 and 15 may be used for coupling the video system 112 to a source of power.

As shown in FIG. 16, the embodiment provides for two RF transmitters 146 making it possible for individuals sitting next to each other to watch different videos and listen to the different videos through wireless headphones.

Figure 17:
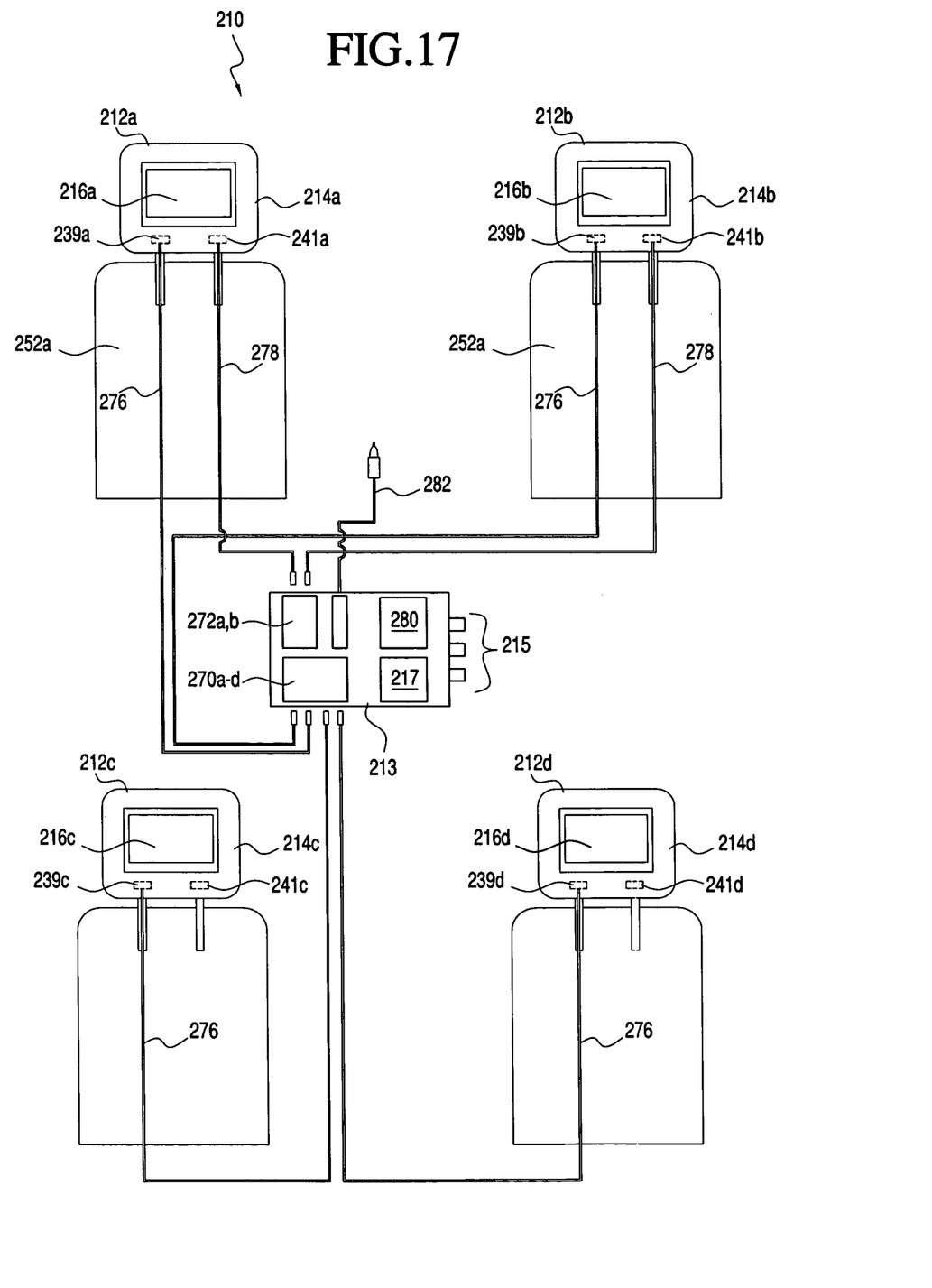
FIG. 17 is a schematic of a further embodiment in accordance with the present invention.

In accordance with yet a further embodiment and with reference to FIG. 17, each video system 212a-d is provided with an input 239a-d and an output 241a-d providing the ability to input and output video and audio signals for use in conjunction with other video systems found within the same automobile. As those skilled in the art will certainly appreciate, there are times when people sitting within an automobile will wish to watch the same thing on different video systems. In accordance with a preferred embodiment of the present, the plurality of video systems 212 a-d within the automobile may be linked. As such, the content of a DVD playing in one video system 212 a-d may be transferred to the other video system(s) 212a-d such that people viewing other video systems 212 a-d installed within an automobile can simultaneously watch and listen to the same video content. The use of the switching system described below does not negate the ability of an automobile passenger to individually watch a video without sharing via the central switching assembly 213.

With this mind and with reference to FIG. 17, an entertainment system 210 employing four linked video systems 212a-d is disclosed. The entertainment system 210 includes a central switching assembly 213 to which the various video systems 212a-d are linked for outputting signals to and receiving signals from. The central switching assembly 213 receives and transmits video and audio content in a controlled manner such that the same audio and video content is selectively provided for individuals viewing different monitors 216a-d while sitting in an automobile. This is accomplished by linking the audio and video inputs 239a-d and outputs 241a-d from the various video systems 212a-d installed with a vehicle and selectively transmitting the desired content to the different video systems 212a-d. The central switching assembly 213 also includes a separate audio/video input 215 (for example, RCA plugs) for receiving video content from a remote source for transmission to the various video systems 212a-d connected thereto.

More specifically, the central switching assembly 213 is provided with the ability to receive audio and video outputs from the various video systems 212a-d connected thereto and transmit, in a predetermined manner under the control of the vehicle operator, video and audio inputs to the various video systems 212a-d connected thereto. In addition, to providing for the ready transfer of information between the various video systems 212a-d connected thereto, the central switching assembly 213 is also provided with a wireless FM transmitter 217. The transmitter 217 allows for the transmission of audio signals to the automobile radio (not shown) for listening on a predetermined frequency via the automobile stereo. In particular, and as those skilled in the art will certainly appreciate, the transmitter 217 is designed to transmit audio signals on a predetermined frequency receivable by the vehicle radio. The signal is received by the vehicle radio, demodulated and played over the vehicle stereo. The central switching assembly 213 may also be provided with a TV tuner, a modulator and/or other wireless transmitters.

With regard to the system disclosed with reference to FIG. 17, a first video system 212a, a second video system 212b, a third video system 212c and a fourth video system 212d are provided. The first and second video systems 212a, 221b are positioned within the respective headrests 214a, 214b of the front vehicle seats 252a, 252b, while the third and fourth video systems 212c, 212d are positioned within the respective headrests 214c, 214d of the second row of seating found in the automobile. In accordance with the disclosed configuration, the first and second video systems 212a, 212b are coupled to both audio/video inputs 270a, 270b and audio/video outputs 272a, 272b, while the third and fourth video systems are only connected with audio/video inputs 270c, 270d coming from the central switching assembly 213. As with the various embodiments described above, the cables coupling the first, second, third and fourth video systems 212a-d to the central switching assembly 213 are passed through the extension arm of the headrest 214a-d and down the back of the vehicle seat 252a-d. While a specific configuration is disclosed in accordance with a preferred embodiment of the present invention, the input and output configurations may be readily varied without departing from the spirit of the present invention.

With reference to the first and second video systems 212a-d, each includes two six-pin cables 276, 278 extending therefrom, one for the input side 239a, 239b of the system and the other for the output side 241a, 241b of the video system 212a, 212b. Each of the six-pin cables 276, 278 is passed through a respective extension arm of the headrest 214a, 214b. With reference to the output side 241a, 241b of the video system 212a, 212b, the six-pin cable 278 includes wiring for power, right and left audio output signals, and a video output signal. In this way, the first and second video systems are able to readily transfer video and audio information to the central switching assembly 213 for sharing with the remaining video systems 212a-d connected thereto.

As mentioned above, each of the first, second, third and fourth video systems 212a-d include an input cable 276 for receiving audio and video signals from the central switching assembly 213. In accordance with a preferred embodiment of the present invention, each of the input cables 276 is a six-pin cable includes wiring for power, right and left audio input signals, and a video input signal. In this way, the first, second, third and fourth video systems 212a-d are able to readily receive video and audio information from the central switching assembly 213.

With output cables 278 transferring audio and video signals to the central switching assembly 213, and input cables 276 transferring audio and video signals to the video systems 212a-d, the central switching assembly 213 includes a central processor 280 programmed to control to the transmission of signals in an efficient manner.

The power supply 282 for the video systems 212a-d is run through the central switching assembly 213. As mentioned above, each of the cables 276, 278 coupled to the various video systems 212a-d includes wiring for power transmission. With this in mind, the central switching assembly 213 is linked to a power source 282, for example, an auxiliary power plug commonly found in vehicles or a direct link to the vehicle power source via cable previously discussed with reference to FIGS. 14 and 15, respectively. The power supplied to the central switching assembly 213 is then transferred to the various video systems 212a-d via the power lines of the six-pin cables 276, 278 linking the video systems 212a-d to the central switching assembly 213.

Through implementation of the switching system described above, automobile passengers have the choice of watching individual videos by using the video systems as self contained units or watching the same video through the linking provided via the implementation of the central switching assembly 213.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. An automobile entertainment system, comprising:
   a plurality of video systems, each video system mounted within an automobile headrest, the headrest including a headrest body and a first downwardly extending extension arm having a passage extending therethrough;
   a central switching assembly linking the plurality of video systems;
   each of the plurality of video systems includes a video monitor and a video source, each of the plurality of video systems also including an output transmitting signals to the central switching assembly to transfer to the remaining video systems and each of the plurality of video systems including an input transmitting signals from the central switching assembly to the respective video systems;
   the output of each of the plurality of video systems includes wiring for power, right and left audio output signals, and a video output signal which pass through a back of a vehicle seat and are coupled to the central switching assembly; and
   the input for each of the plurality of video systems includes wiring for power, right and left audio output signals, and video output signals which pass through the back of the vehicle seat and are coupled to the central switching assembly.

2. The entertainment system according to claim 1, wherein the video source is a DVD player.

3. The entertainment system according to claim 1, wherein the central switching assembly includes a wireless transmitter.

4. The entertainment system according to claim 3, wherein the wireless transmitter is an FM wireless transmitter for the transmission of audio signals to an automobile radio.

5. The entertainment system according to claim 1, wherein the plurality of video systems includes a first video system, a second video system, a third video system and a fourth video system.

6. The entertainment system according to claim 5, wherein the first video system and the second video system respectively include an output transmitting signals to the central switching assembly.

7. The entertainment system according to claim 1, wherein the central switching assembly includes a central processor programmed to control the transmission of signals in an efficient manner.

8. The entertainment system according to claim 1, wherein the central switching assembly supplies power to the various video systems connected thereto.

9. The entertainment system according to claim 8, wherein the central switching assembly is connected to an automobile power supply.

* * * * *